US012681313B2

(12) United States Patent
Wang et al.

(10) Patent No.: US 12,681,313 B2
(45) Date of Patent: Jul. 14, 2026

(54) HEAD-MOUNTABLE DEVICES WITH MODULAR LENS ASSEMBLIES

(71) Applicant: Apple Inc., Cupertino, CA (US)

(72) Inventors: Paul X. Wang, Cupertino, CA (US); Jeremy C. Franklin, San Francisco, CA (US); Adam Y. Kollgaard, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 268 days.

(21) Appl. No.: 18/559,556

(22) PCT Filed: May 10, 2022

(86) PCT No.: PCT/US2022/028627

§ 371 (c)(1),
(2) Date: Nov. 7, 2023

(87) PCT Pub. No.: WO2022/240901

PCT Pub. Date: Nov. 17, 2022

(65) Prior Publication Data

US 2024/0241386 A1 Jul. 18, 2024

Related U.S. Application Data

(60) Provisional application No. 63/186,726, filed on May 10, 2021.

(51) Int. Cl.
*G02B 27/01* (2006.01)
(52) U.S. Cl.
CPC ..... *G02B 27/0176* (2013.01); *G02B 27/0172* (2013.01)

(58) Field of Classification Search
None
See application file for complete search history.

(56) References Cited

U.S. PATENT DOCUMENTS 10,133,305 B1 11/2018 Sullivan et al.
10,571,691 B1 2/2020 Yee et al.
(Continued)

FOREIGN PATENT DOCUMENTS

CN 110603476 A 12/2019
CN 210803870 U 6/2020
(Continued)

OTHER PUBLICATIONS

International Search Report and Written Opinion from PCT/US2022/028627, dated Sep. 26, 2022, 11 pages.
(Continued)

*Primary Examiner* — Phu Vu
(74) *Attorney, Agent, or Firm* — BAKERHOSTETLER

(57) ABSTRACT

A head-mountable device can include assemblies that provide fit adjustment capabilities when assembled together. By providing head-mountable devices with modular features, certain assemblies can provide fit adjustment capabilities without requiring other assemblies to be custom designed or available in a wide variety of sizes and/or shapes. A lens assembly can provide one or more lenses that accommodate a user's vision correction needs. The lenses can be provided in a manner that allows them to be coupled to displays of the head-mountable device, which can move as needed. The lenses can be coupled to displays to move with the displays.

19 Claims, 6 Drawing Sheets

(56) References Cited

U.S. PATENT DOCUMENTS

| 2013/0222235 | A1 | 8/2013 | Abdollahi et al. | |
| 2014/0176398 | A1 | 6/2014 | West et al. | |
| 2017/0082859 | A1 | 3/2017 | Drinkwater et al. | |
| 2017/0192198 | A1* | 7/2017 | Bristol | G02B 7/22 |
| 2018/0011329 | A1* | 1/2018 | Choi | G02B 27/0176 |
| 2019/0380875 | A1* | 12/2019 | Esmonde | A61F 9/022 |
| 2020/0174284 | A1* | 6/2020 | Chan | G02F 1/13306 |
| 2020/0400948 | A1 | 12/2020 | Maric et al. | |

FOREIGN PATENT DOCUMENTS

| CN | 112262619 A | 1/2021 |
| CN | 112285928 A | 1/2021 |
| CN | 112673301 A | 4/2021 |

OTHER PUBLICATIONS

Chinese Patent Application No. 2022800342783, First Office Action dated Apr. 15, 2026, 25 pages, with English translation.

* cited by examiner

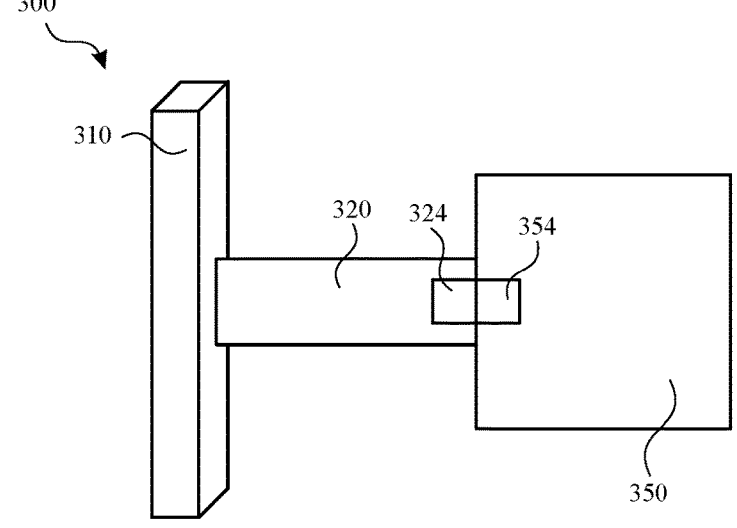
FIG. 9
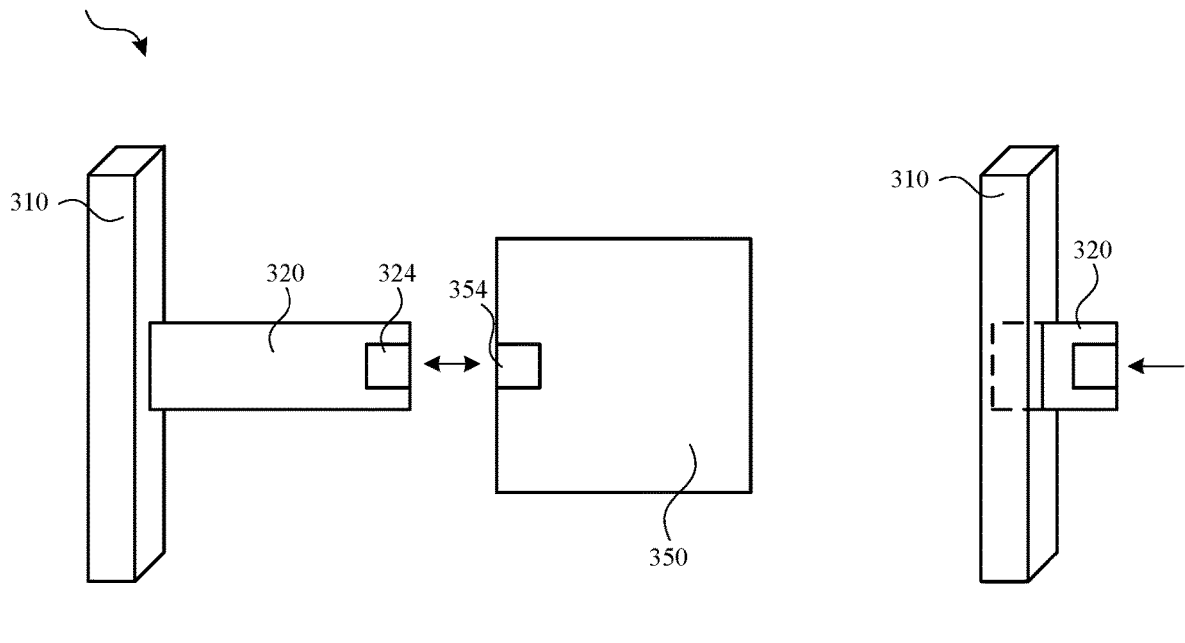
FIG. 10          FIG. 11

HEAD-MOUNTABLE DEVICES WITH MODULAR LENS ASSEMBLIES

CROSS-REFERENCE TO RELATED APPLICATION

This application claims the benefit of U.S. Provisional Application No. 63/186,726, entitled "HEAD-MOUNT-ABLE DEVICES WITH MODULAR LENS ASSEM-BLIES," filed May 10, 2021, the entirety of which is incorporated herein by reference.

TECHNICAL FIELD

The present description relates generally to head-mount-able devices, and, more particularly, to head-mountable devices with modular lens assemblies.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mount-able device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

FIG. 9 illustrates a perspective view of a portion of a lens assembly with a lens in an engaged configuration, according to some embodiments of the present disclosure.

FIG. 10 illustrates a perspective view of the portion of the lens assembly of FIG. 9 with the lens in an unengaged configuration, according to some embodiments of the pres-ent disclosure.

FIG. 11 illustrates a perspective view of a portion of the lens assembly of FIGS. 9 and 10 with a tether in a retracted configuration, according to some embodiments of the pres-ent disclosure.

DETAILED DESCRIPTION

Figure 1:
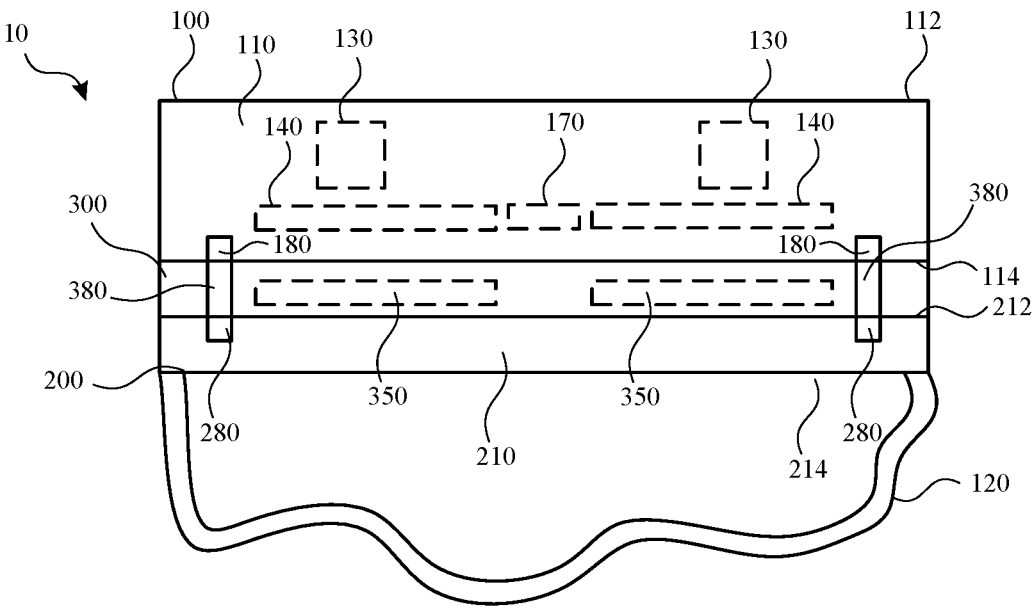
FIG. 1 illustrates a top view of a head-mountable device, according to some embodiments of the present disclosure.

The detailed description set forth below is intended as a description of various configurations of the subject technol-ogy and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and com-ponents are shown in block diagram form in order to avoid obscuring the concepts of the subject technology.

Head-mountable devices, such as head-mountable dis-plays, headsets, visors, smartglasses, head-up display, etc., can perform a range of functions that are managed by the components (e.g., sensors, circuitry, and other hardware) included with the wearable device.

Many of the functions performed by a head-mountable device are optimally experienced when the components are in their most preferred position and orientation with respect to a user wearing the head-mountable device. For example, the head-mountable device can include a display that visu-ally outputs display-based information toward the eyes of the user. The position and orientation of the displays relative to the eyes depends, at least in part, on how the head-mountable device is positioned on the face of the user. Due to variations in facial features across different users, a given head-mountable device may require adjustment to accom-modate different users. For example, different users can have different facial features (e.g., face plane slope, forehead size, eye location). Accordingly, different users may perceive the displayed information differently.

Additionally, the visual output features of a head-mount-able device can be provided in a manner that accommodates a user's vision, including vision deficiencies and/or needs for vision correction. For example, a head-mountable device can include or be combinable with corrective lenses that allow a user to properly view the visual output features of the head-mountable device. To allow a given head-mount-able device can be used by different users, the corrective lenses can be provided as a separate assembly that is attachable, removable, and/or exchangeable with other cor-rective lenses. Accordingly, any given user can properly view the visual output features when using the head-mountable device with an appropriate corresponding set of corrective lenses.

Systems, devices, and methods of the present disclosure can provide a head-mountable device with assemblies that provide fit adjustment capabilities when assembled together. By providing head-mountable devices with modular features, certain assemblies can provide fit adjustment capabilities without requiring other assemblies to be custom designed or available in a wide variety of sizes and/or shapes. A lens assembly can provide one or more lenses that accommodate a user's vision correction needs. The lenses can be provided in a manner that allows them to be coupled to displays of the head-mountable device, which can move as needed. The lenses can be coupled to displays to move with the displays.

These and other embodiments are discussed below with reference to FIGS. 1-13. However, those skilled in the art will readily appreciate that the detailed description given herein with respect to these Figures is for explanatory purposes only and should not be construed as limiting.

According to some embodiments, for example as shown in FIG. 1, a head-mountable device 10 includes a display assembly 100 and a face seal assembly 200. The display assembly 100 includes a frame 110 that is worn on a head of a user. The frame 110 can be positioned in front of the eyes of a user to provide information within a field of view of the user. The display assembly 100 and/or the face seal assembly 200 can provide nose pads or another feature to rest on a user's nose.

The frame 110 can be supported on a user's head with the head engager 120. The head engager 120 can wrap or extend along opposing sides of a user's head. The head engager 120 can optionally include earpieces for wrapping around or otherwise engaging or resting on a user's ears. It will be appreciated that other configurations can be applied for securing the head-mountable device 10 to a user's head. For example, one or more bands, straps, belts, caps, hats, or other components can be used in addition to or in place of the illustrated components of the head-mountable device 10. By further example, the head engager 120 can include multiple components to engage a user's head. The head engager 120 can extend from the display assembly 100 and/or the face seal assembly 200.

The frame 110 can provide structure around a peripheral region thereof to support any internal components of the frame 110 in their assembled position. For example, the frame 110 can enclose and support various internal components (including for example integrated circuit chips, processors, memory devices and other circuitry) to provide computing and functional operations for the head-mountable device 10, as discussed further herein. While several components are shown within the frame 110, it will be understood that some or all of these components can be located anywhere within or on the head-mountable device 10. For example, one or more of these components can be positioned within the head engager 120 of the head-mountable device 10.

The frame 110 can include and/or support one or more cameras 130. The cameras 130 can be positioned on or near an outer side 112 of the frame 110 to capture images of views external to the head-mountable device 10. As used herein, an outer side of a portion of a head-mountable device is a side that faces away from the user and/or towards an external environment. The captured images can be used for display to the user or stored for any other purpose. Each of the cameras 130 can be movable along the outer side 112. For example, a track or other guide can be provided for facilitating movement of the camera 130 therein.

The head-mountable device 10 can include displays 140 that provide visual output for viewing by a user wearing the head-mountable device 10. One or more displays 140 can be positioned on or near an inner side 114 of the frame 110. As used herein, an inner side 114 of a portion of a head-mountable device is a side that faces toward the user and/or away from the external environment.

A display 140 can transmit light from a physical environment (e.g., as captured by a camera) for viewing by the user. Such a display 140 can include optical properties, such as lenses for vision correction based on incoming light from the physical environment. Additionally or alternatively, a display 140 can provide information as a display within a field of view of the user. Such information can be provided to the exclusion of a view of a physical environment or in addition to (e.g., overlaid with) a physical environment.

A physical environment relates to a physical world that people can sense and/or interact with without necessarily requiring the aid of an electronic device. A computer-generated reality environment relates to a wholly or partially simulated environment that people sense and/or interact with the assistance of an electronic device. Examples of computer-generated reality include mixed reality and virtual reality. Examples of mixed realities can include augmented reality and augmented virtuality. Some examples of electronic devices that enable a person to sense and/or interact with various computer-generated reality environments include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable device can have an integrated opaque display, have a transparent or translucent display, or be configured to accept an external opaque display (e.g., smartphone).

Each display 140 can be adjusted to align with a corresponding eye of the user. For example, each display 140 can be moved along one or more axes until a center of each display 140 is aligned with a center of the corresponding eye. Accordingly, the distance between the displays 140 can be set based on an interpupillary distance ("IPD") of the user. IPD is defined as the distance between the centers of the pupils of a user's eyes.

The pair of displays 140 can be mounted to the frame 110 and separated by a distance. The distance between the pair of displays 140 can be designed to correspond to the IPD of a user. The distance can be adjustable to account for different IPDs of different users that may wear the head-mountable device 10. For example, either or both of the displays 140 may be movably mounted to the frame 110 to permit the displays 140 to move or translate laterally to make the distance larger or smaller. Any type of manual or automatic mechanism may be used to permit the distance between the displays 140 to be an adjustable distance. For example, the displays 140 can be mounted to the frame 110 via slidable tracks or guides that permit manual or electronically actuated movement of one or more of the displays 140 to adjust the distance there between.

Additionally or alternatively, the displays 140 can be moved to a target location based on a desired visual effect that corresponds to user's perception of the display 140 when it is positioned at the target location. The target location can be determined based on a focal length of the user and/or optical components of the system. For example, the user's eye and/or optical components of the system can determine how the visual output of the display 140 will be perceived by the user. The distance between the display 140 and the user's eye and/or the distance between the display 140 and one or more optical components can be altered to place the display 140 at, within, or outside of a corresponding focal distance. Such adjustments can be useful to accommodate a particular user's eye, corrective lenses, and/or a desired optical effect.

While the face seal assembly 200 is shown schematically with a particular size and shape, it will be understood that the size and shape of the face seal assembly 200, particularly at the inner side 214 of the face seal assembly 200, can have a size and shape that accommodates the face of a user wearing the head-mountable device 10. For example, the inner side 214 can provide a shape that generally matches the contours of the user's face around the eyes of the user. The inner side 214 can be provided with one or more features that allow the face seal assembly 200 to conform to the face of the user to enhance comfort and block light from entering the face seal assembly 200 at the point of contact with the face. For example, the inner side 214 can provide a flexible, soft, elastic, and/or compliant structure.

While the head-mountable device 10 is worn by a user, with the inner side 214 of the face seal assembly 200 against the face of the user and/or with the head engager 120 against the head of the user, the face seal assembly can remain in a fixed location and orientation with respect to the face and head of the user. Furthermore, in such a configuration the display assembly 100 can also be maintained in a fixed location and orientation with respect to the face and head of the user. Given the variety of head and face shapes that different users may have, it can be desirable to provide a face seal assembly 200 with customization and adjustability so that the display assembly 100 is in a desired position and orientation with respect to the face and head of the user during use.

The display assembly 100 and the face seal assembly 200 can provide an interface that allows adjustment and customization of relative distances and orientations there between. For example, the face seal assembly 200 can include a chassis 210 that provides structural support to one or more other components of the face seal assembly 200. The chassis 210, or portions thereof, can extend to, from, and/or between the inner side 214 and the outer side 212, as well as the upper side 218 and the lower side 216. The chassis 210 can support a cover that extends at least partially from the outer side 212 to the inner side 214. The chassis 210 and/or the cover can define an interior space through which light can pass, thereby providing to the user wearing the head-mountable device a view of a display of the display assembly 100. Such a view can be enhanced by preventing the ingress of light from the external environment and into the face seal assembly 200.

The head-mountable device can include one or more lens assemblies 300 that couple the display assembly 100 to the face seal assembly 200 with a relative position and orientation that is preferred for a given user. The lens assembly 300 can have a side that matches the contours of the inner side 114 of the display assembly 100 and an opposite side that matches the contours of the outer side 212 of the face seal assembly 200.

As further shown in FIG. 1, the lens assembly 300 can be or include one or more lenses 350 for providing corrective vision capabilities. It will be understood that, where multiple lenses are used, the lenses 350 of the lens assembly 300 can be provided together or separately (e.g., for combination).

The one or more lenses 350 can provide one or more types of optical effects and/or vision correction. Lenses 350 can include other optical components as required to produce a desired optical effect. For example, lenses 350 can provide vision correction to light as appropriate for a given user. Such correction can be spherical, aspheric, atoric, cylindrical, single vision, multifocal, progressive, and/or adjustable. By further example, lenses 350 can include one or more diffusers, filters, polarizers, prisms, beam splitters, diffraction gratings, mirrors, and/or windows. The differences in correction or other effects among lenses 350 of different lens assemblies 300 can include variations in type of correction, diopter power, axis of correction, and the like. Various combinations of corrections can be provided with different lens assemblies 300. For example, each of the lenses 350 of any given lens assembly 300 can have a known type of correction based on the identity thereof. Corresponding identifiers, such as stock keeping units ("SKU"), can be assigned for reference and to facilitate selection of a lens assembly 300 for a given user. Accordingly, different users can use different lens assemblies 300 and/or no lens assembly 300 as desired.

Figure 2:
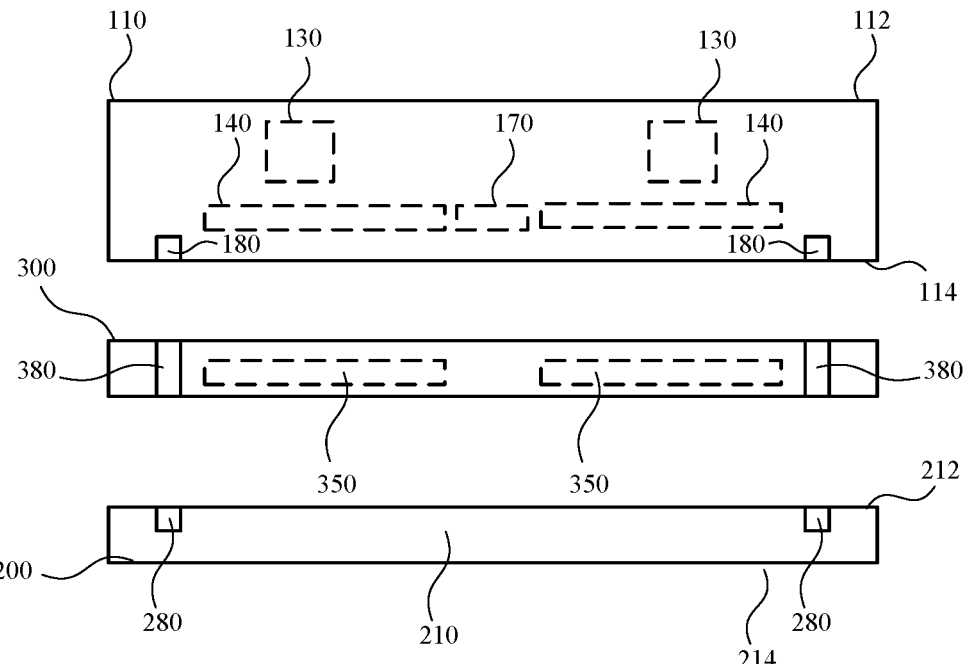
FIG. 2 illustrates an exploded top view of a portion of the head-mountable device of FIG. 1, according to some embodiments of the present disclosure.

As shown in FIGS. 1 and 2, the lens assembly 300 can include a housing 310 that defines at least a portion of the periphery of the lens assembly 300. The housing 310 can extend partially or entirely about an interior region defined within the lens assembly 300. The lens assembly 300 can further include one or more lens assembly engagers 380 (e.g., magnets) supported by the housing 310. Lens assembly engagers 380 can facilitate coupling of the lens assembly 300 to the head-mountable device 10 in a relative position and orientation that aligns the housing 310 of the lens assembly 300 in a preferred position and orientation relative to the frame 110 of the display assembly 100 and/or the chassis 210 of the face seal assembly. The housing 310 of the lens assembly 300 can be simultaneously coupled to the frame 110 and the chassis 210. It will be understood that such placement can allow the lens assembly 300 to be securely held in any location that places the lenses 350 within a field of view of the user and/or between the user and the displays 140.

The head-mountable device 10, the face seal assembly 200, and the lens assembly 300 can be securely and releasably coupled together. For example, display assembly engagers 180 of the display assembly 100 and/or face seal assembly engager 280 of the face seal assembly 200 can releasably engage the lens assembly engagers 380. One or more of various mechanisms can be provided to secure the components to each other. For example, mechanisms such as locks, latches, snaps, slides, channels, screws, clasps, threads, magnets, pins, an interference (e.g., friction) fit, knurl presses, bayoneting, fused materials, weaves, knits, braids, hook and loop fasteners, and/or combinations thereof can be included to couple and/or secure the head-mountable device 10 together. The components can remain secured to each other until an optional release mechanism is actuated. The release mechanism can be provided for access by a user.

As further shown in FIGS. 1 and 2, the lens assembly 300 can facilitate coupling of the display assembly 100 to the face seal assembly 200 in a relative position and orientation that aligns the displays 140 of the display assembly 100 in a preferred position and orientation for viewing by the user. The lens assembly 300 can sealingly engage against the display assembly 100 and/or the face seal assembly 200 to prevent ingress of light from an external environment. Additionally or alternatively, the lens assembly 300 can extend at least partially within and/or about one or more portions of the display assembly 100 and/or the face seal assembly 200. The lens assembly engagers 380 of the lens assembly 300 can be coupled to corresponding display assembly engagers 180 of the display assembly 100 and/or face seal assembly engager 280 of the face seal assembly 200.

As described herein, at least some of the engagers can include magnets. As used herein, "magnet" can include a magnet of a hard magnetic material and/or a magnet of a soft magnetic material. For example, some of the magnets (e.g., of the display assembly engagers 180, the face seal assembly engagers 280, and/or the lens assembly engagers 380) can form permanent magnets and some of the magnets can be responsive to magnetic fields. Hard magnetic materials include materials that retain their magnetism even after the removal of an applied magnetic field. Magnets that include hard magnetic material can form permanent magnets. Hard magnetic materials include neodymium (NdFeB), ferrite, AlNico, iron-neodymium, iron-boron, cobalt-samarium, iron-chromium-cobalt, and combinations or alloys thereof. Soft magnetic materials include materials that are responsive to magnetic fields, but do not retain their magnetism after removal of an applied magnetic field. Magnets that include soft magnetic material can form temporary magnets. Soft magnetic materials include iron, iron-cobalt, iron-silicon (FeSi), steel, stainless steel, iron-aluminum-silicon, nickel-iron, ferrites, and combinations or alloys thereof. It will be recognized that "hard magnetic" and "soft magnetic" does not necessarily relate to the rigidity of the materials. It will be understood that other attachment mechanisms can be employed in addition to or as an alternative to magnets.

As further shown in FIGS. 1 and 2, the lens assembly 300 can couple the face seal assembly 200 to the display assembly 100 in a position and orientation that is preferred for alignment, for example of the display 140, with respect to the user. For example, the lens assembly 300 can provide a shape that tilts the face seal assembly 200 relative to the display assembly 100 at a desired angle. By further example, the lens assembly 300 can have variable thicknesses at different portions thereof, such as at upper and lower portions thereof. This can result in the tilt that forms a non-zero angle between the face seal assembly 200 and the display assembly 100. It will be understood that the angle can be any size, as well as formed on any side of the head-mountable device 10. For example, the tilt can be upward or downward. Additionally or alternatively, the angle can also be formed on another (e.g., right or left) side of the head-mountable device 10. For example, the tilt can be formed to control the position and/or orientation of the display assembly 100 with respect to each of the right and left eyes of the user. Other directions of tilt can also be achieved.

Figure 4:
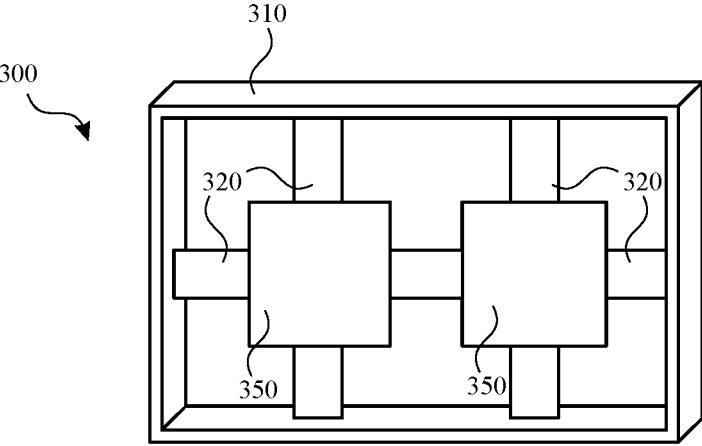
FIG. 4 illustrates a perspective view of a lens assembly, according to some embodiments of the present disclosure.

As further shown in FIG. 4, the lens assembly 300 can be selected to control a total distance between the display 140 and the user's eyes. For example, whether or not an angle is formed by controlling the relative orientations of the face seal assembly 200 and the display assembly 100, the lens assembly 300 can control the relative position of the face seal assembly 200 and the display assembly 100 by providing a selected spacing there between. Given a known position of the eyes relative to the face seal assembly 200, the lens assembly 300 can thereby be selected for a given user to position the displays 140 at a preferred position.

The tilt and spacing provided by the lens assembly 300 can correspond to a shape of the user's face (e.g., face plane), in which the lens assembly 300 is selected to achieve a particular orientation of the display assembly 100 regardless of face shape. Accordingly, the lens assembly 300 can be provided to accommodate a wide variety of face shapes without requiring modification or customization of either of the face seal assembly 200 or the display assembly 100. As such, any given face seal assembly 200 and display assembly 100 can be used by a variety of different users where each user can be provided with a lens assembly 300 that accommodates that user's face.

The attachment of the lens assembly 300 can be further facilitated by mechanisms that guide the components into preferred relative positions. For example, the lens assembly 300 can include one or more posts that are received into corresponding recesses of the display assembly 100 and/or the face seal assembly 200. It will be further understood that the positions of the posts and recesses can be swapped, such that the display assembly 100 and/or the face seal assembly 200 provides posts that are received by recesses of the lens assembly 300.

It will be understood that the face seal assembly 200 and the display assembly 100 can be coupled together without the lens assembly 300. For example, the display assembly engagers 180 of the display assembly 100 can engage the face seal assembly engagers 280 of the face seal assembly 200. In such a configuration, the lenses can be omitted, such as when no correction is desired (e.g., when a different user is wearing the head-mountable device 10 or when the user is separately wearing eye correction).

Figure 3:
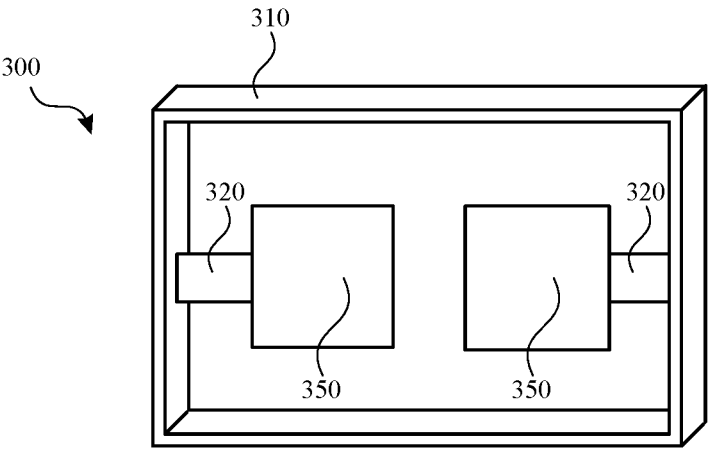
FIG. 3 illustrates a perspective view of a lens assembly, according to some embodiments of the present disclosure.

Referring now to FIGS. 3 and 4, the lenses can be supported in a manner that allows them to move within the lens assembly. For example, as shown in FIG. 3, the lens assembly 300 can include the housing 310 that defines at least a portion of the periphery of the lens assembly 300. The housing 310 can extend partially or entirely about an interior region defined within the lens assembly 300. Within the interior region, one or more lenses 350 can be provided. The one or more lenses 350 can be coupled to the housing 310 by one or more tethers 320 that extend between and are coupled to each of the housing 310 and a corresponding lens 350. The tethers 320 can facilitate movement of the lenses 350 with respect to the housing 310. For example, the tethers 320 can be stretchable, flexible, and/or twistable to allow the lenses 350 to move and/or rotate with respect to the housing 310. For example, the tethers can include a polymer, fabric, yarn, and the like. The material can be formed as a monolithic piece, a mesh, a weave, a braid, and/or combinations thereof.

As shown in FIG. 4, each of the one or more lenses 350 can be supported by multiple tethers 320. One or more of the tethers 320 can extend between and be coupled to multiple lenses 350. It will be understood that any number of tethers 320 can be provided to each of the lenses 350.

Figure 5:
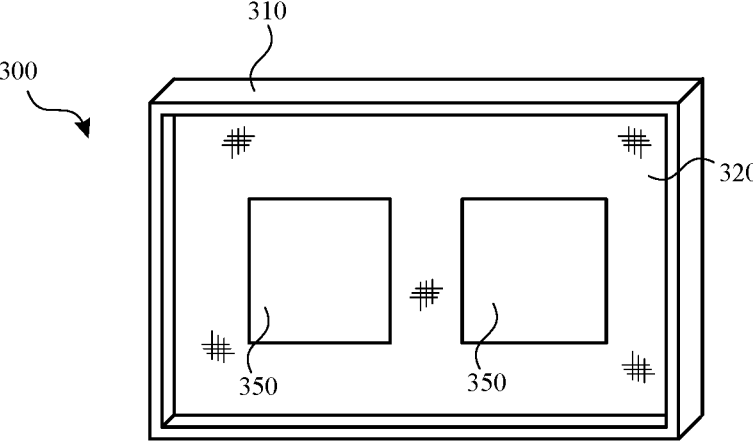
FIG. 5 illustrates a perspective view of a lens assembly, according to some embodiments of the present disclosure.

As shown in FIG. 5, the lenses 350 can be suspended by a tether 320 formed as a sheet, mesh, or net that extends continuously about each of the lenses 350 and attaches to the housing 310. The tether 320 can be formed by an elastomer and/or textile that provides adequate flexibility for movement of the lenses 350 in multiple directions. The tether 320 can couple to an entire outer periphery of each of the lenses 350 and to an entire inner periphery of the housing 310, providing continuous structure there between. Such a tether 320, along with the lenses 350, can form a continuous barrier between opposing (e.g., inner and outer) sides of the lens assembly 300. Accordingly, light can be limited through the tether 320, while light is allowed to pass through the lenses 350. Additionally or alternatively, the tether 320 can optionally be at least partially breathable and/or porous to allow an amount of air to flow there through.

Figure 6:
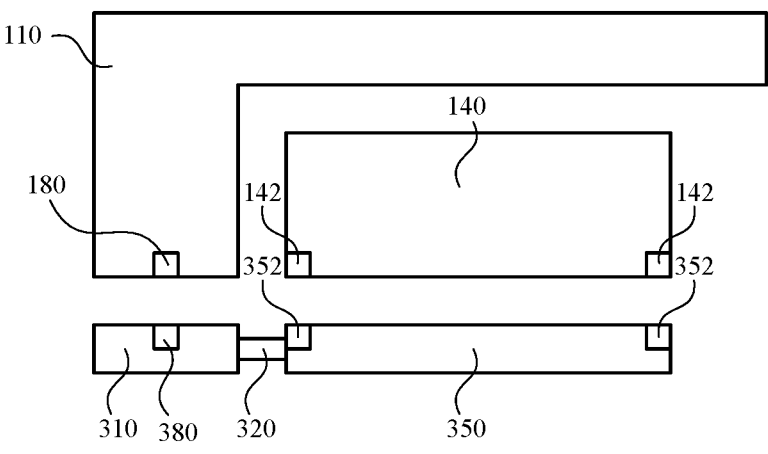
FIG. 6 illustrates a top view of assemblies of a head-mountable device in an unengaged configuration, according to some embodiments of the present disclosure.
Figure 7:
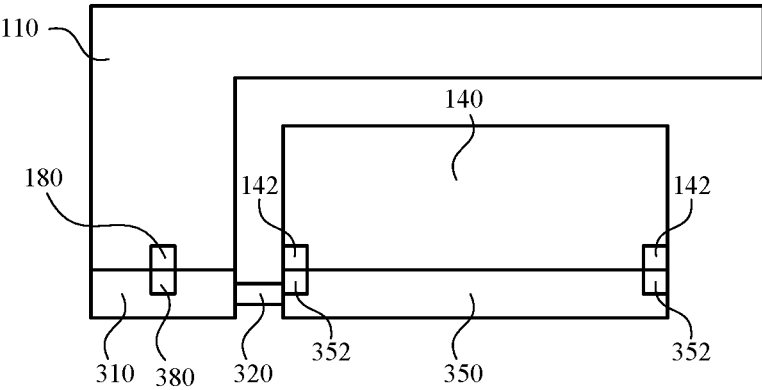
FIG. 7 illustrates a top view of the assemblies of FIG. 6 in an engaged configuration, according to some embodi-ments of the present disclosure.
Figure 8:
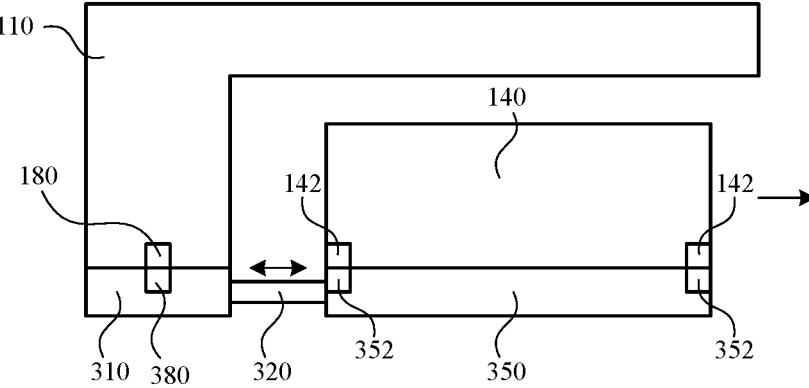
FIG. 8 illustrates a top view of the assemblies of FIGS. 6 and 7 in an engaged and extended configuration, according to some embodiments of the present disclosure.

Referring now to FIGS. 6-8, the lenses can be directly coupled to corresponding displays to move therewith. For example, as shown in FIG. 6, in addition to coupling the lens assembly engagers 380 of the lens assembly 300 to corresponding display assembly engagers 180 of the display assembly 100, the lenses 350 can each include one or more lens assembly engagers 352, and the displays 140 can include one or more display engagers 142.

As shown in FIG. 7, the lens assembly engagers 352 of the lenses 350 can releasably couple to corresponding display engagers 142 of the displays 140. One or more of various mechanisms can be provided to secure the components to each other. For example, mechanisms such as locks, latches, snaps, slides, channels, screws, clasps, threads, magnets, pins, an interference (e.g., friction) fit, knurl presses, bayoneting, fused materials, weaves, knits, braids, hook and loop fasteners, and/or combinations thereof can be included. The coupled components can remain secured to each other until an optional release mechanism is actuated. The release mechanism can be provided for access by a user.

As shown in FIG. 6, the display 140 can move as needed (e.g., for IPD accommodation, etc.) with respect to the frame 110. As the display 140 moves, the lens 350 can move with the display 140 when coupled thereto. For example, the tether 320 can accommodate movement of the lens 350 by stretching, bending, and/or twisting as needed to provide the lens 350 with adequate range of motion. Coupling of the lens 350 to the display 140 can be maintained by the engagement of the lens assembly engagers 352 and the display engagers 142 throughout such motion.

It will be understood that the lens assembly engagers 380 can engage the display assembly engagers 180 when the lens assembly engagers 352 engage the display engagers 142. It will be further understood that the lens assembly engagers 380 can disengage the display assembly engagers 180 when the lens assembly engagers 352 disengage the display engagers 142. Alternatively, engagement and/or disengagement between different pairs of engagers can occur at different times.

Referring now to FIGS. 9-11, the lens assembly can provide features for customization. For example, as shown in FIG. 9, the lenses 350 can each include one or more lens assembly engagers 354, and the tethers 320 can each include one or more tether engagers 324.

As shown in FIG. 9, the lens assembly engagers 354 of the lenses 350 can releasably couple to corresponding tether engagers 324 of the tethers 320. One or more of various mechanisms can be provided to secure the components to each other. For example, mechanisms such as locks, latches, snaps, slides, channels, screws, clasps, threads, magnets, pins, an interference (e.g., friction) fit, knurl presses, bayoneting, fused materials, weaves, knits, braids, hook and loop fasteners, and/or combinations thereof can be included.

As shown in FIG. 10, the coupled components can remain secured to each other until an optional release mechanism is actuated. The release mechanism can be provided for access by a user. Release of the lenses 350 from the tethers 320 can provide a user with the ability to exchange and/or store the components. For example, different users can install different lenses 350 (e.g., providing different vision correction) without exchanging the housing 310. By further example, different users can install a given set of lenses 350 into different housings 310 (e.g., providing a different spacing between the display assembly and the face seal assembly).

As shown in FIG. 11, the tethers 320 can be retracted or otherwise adjusted with respect to the housing 310. For example, the tethers 320 can be stowed against, around, and/or within the housing 310. By further example, the tethers 320 can be stowed (e.g., retracted) so that they are entirely or partially within the housing 310. In such a configuration, at least a portion of the tethers 320 can remain unseen. A biasing member (e.g., spring, coil, etc.) can bias the tethers 320 toward the stowed configuration, such that the tethers 320 are retracted when released. By further example, the tethers 320 can be wrapped around and/or folded against a portion of the housing 310. The tethers 320 can optionally be biased to such a configuration.

It will be understood that such retraction can be performed with or without the lens 350 installed. For example, the extension and retraction ability can facilitate movement of the lens 350 with a display. Additionally or alternatively, extension and retraction can be performed before a lens is installed or after a lens is removed.

Figure 12:
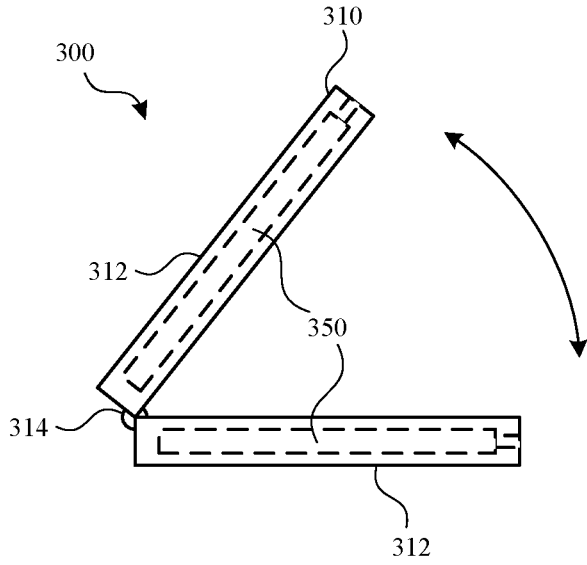
FIG. 12 illustrates a top view of a lens assembly with folding capabilities, according to some embodiments of the present disclosure.
Figure 13:
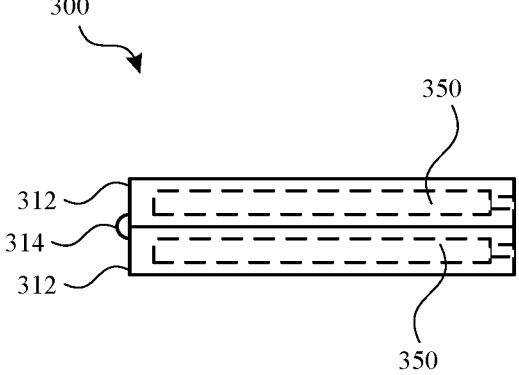
FIG. 13 illustrates a top view of the lens assembly of FIG. 12 in a folded configuration, according to some embodi-ments of the present disclosure.
Figure 14:
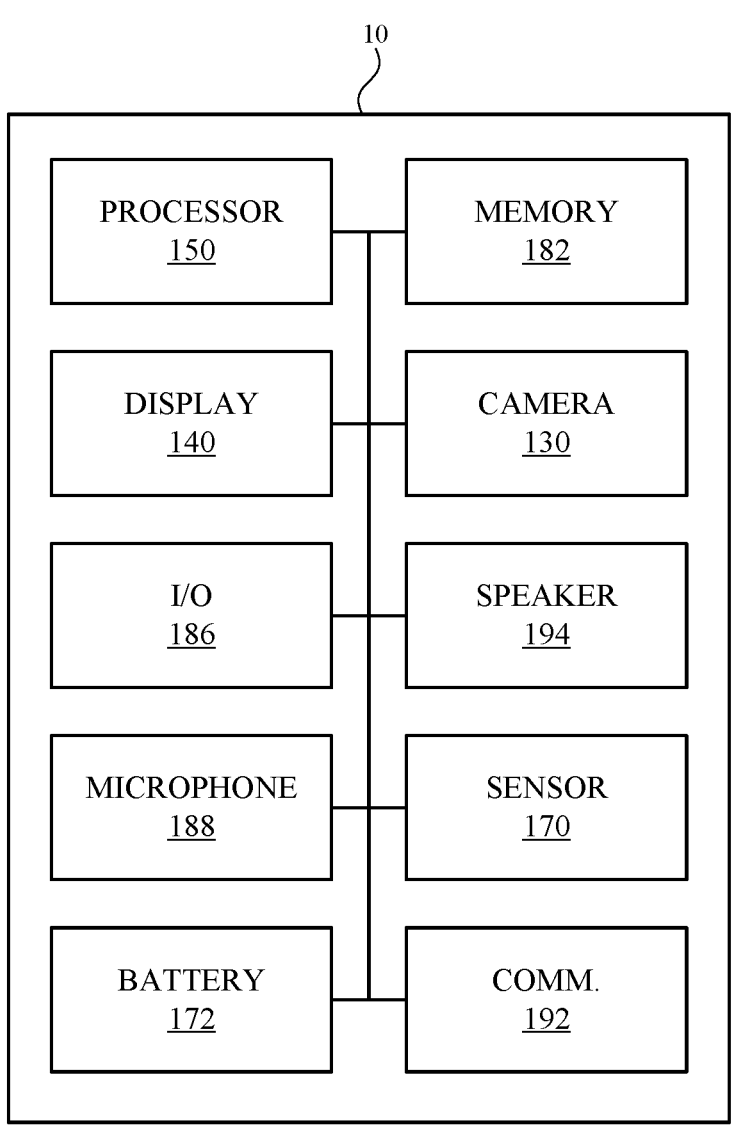
FIG. 14 illustrates a block diagram of a head-mountable device, in accordance with some embodiments of the present disclosure.

Referring now to FIGS. 12 and 13, the lens assembly can provide features for portability. For example, as shown in FIGS. 12 and 13, the lens assembly 300 can fold to provide a more compact form factor for storage, transport, and the like. The lens assembly 314 can provide a hinge or other rotation to facilitate folding and/or rotation of one portion of the lens assembly 300 relative to another. In some embodiments, the lens assembly 300 can fold in half, such that one segment 312 of the housing 310 pivots relative to another segment 312 of the housing 310. As such, the segments 312 can overlap each other in the folded (e.g., stowed) configuration. Additionally, one lens 350 can overlap another lens 350 in the folded configuration. Where the lenses 350 include coatings and the like, the folded configuration can provide protection to inward facing surfaces that are opposite each other. Optionally, a protective layer (e.g., sheet, cloth, etc.) can be provided between overlapping lenses 350.

Referring now to FIG. 11, components of the head-mountable device can be operably connected to provide the performance described herein. FIG. 11 shows a simplified block diagram of an illustrative head-mountable device 10 in accordance with one embodiment of the invention. It will be appreciated that components described herein can be provided on one, some, or all of a display assembly, a face seal assembly, a lens assembly, and/or a head engager. It will be understood that additional components, different components, or fewer components than those illustrated may be utilized within the scope of the subject disclosure.

As shown in FIG. 11, the head-mountable device 10 can include a processor 150 (e.g., control circuitry) with one or more processing units that include or are configured to access a memory 182 having instructions stored thereon. The instructions or computer programs may be configured to perform one or more of the operations or functions described with respect to the head-mountable device 10. The processor 150 can be implemented as any electronic device capable of processing, receiving, or transmitting data or instructions. For example, the processor 150 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the head-mountable device 10. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 10 can further include a display 140 for displaying visual information for a user. The display 140 can provide visual (e.g., image or video) output. The display 140 can be or include an opaque, transparent, and/or translucent display. The display 140 may have a transparent or translucent medium through which light representative of images is directed to a user's eyes. The display 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 10 can include an optical subassembly configured to help optically adjust and correctly project the image-based content being displayed by the display 140 for close up viewing. The optical subassembly can include one or more lenses, mirrors, or other optical devices.

The head-mountable device 10 can include adjustment control components described herein, such as a motor, an actuator, and the like for moving components (e.g., displays 140) to a desired relative position and/or orientation.

The head-mountable device 10 can include one or more sensors 170, such as the sensors of a sensor assembly, as described herein. The head-mountable device 10 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include a camera which can capture image based content of the outside world.

The head-mountable device 10 can include an input/output component 186, which can include any suitable component for connecting head-mountable device 10 to other devices. Suitable components can include, for example, audio/video jacks, data connectors, or any additional or alternative input/output components. The input/output component 186 can include buttons, keys, or another feature that can act as a keyboard for operation by the user.

The head-mountable device 10 can include the microphone 188 as described herein. The microphone 188 can be operably connected to the processor 150 for detection of sound levels and communication of detections for further processing, as described further herein.

The head-mountable device 10 can include the speakers 194 as described herein. The speakers 190 can be operably connected to the processor 150 for control of speaker output, including sound levels, as described further herein.

The head-mountable device 10 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHZ, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 10 can include a battery, which can charge and/or power components of the head-mountable device 10. The battery can also charge and/or power components connected to the head-mountable device 10.

Accordingly, embodiments of the present disclosure provide a head-mountable device with assemblies that provide fit adjustment capabilities when assembled together. By providing head-mountable devices with modular features, certain assemblies can provide fit adjustment capabilities without requiring other assemblies to be custom designed or available in a wide variety of sizes and/or shapes. A lens assembly can provide one or more lenses that accommodate a user's vision correction needs. The lenses can be provided in a manner that allows them to be coupled to displays of the head-mountable device, which can move as needed. The lenses can be coupled to displays to move with the displays.

Various examples of aspects of the disclosure are described below as clauses for convenience. These are provided as examples, and do not limit the subject technology.

Clause A: a head-mountable device comprising: a display assembly comprising: a display; and a display assembly engager; a face seal assembly configured to engage a face of a user, the face seal assembly comprising a face seal assembly; and a lens assembly between the display assembly and the face seal assembly, the lens assembly comprising: a lens; and a lens assembly engager configured to releasably engage the display assembly engager and the face seal assembly and secure the display assembly to the face seal assembly in a fixed relative position and orientation.

Clause B: a head-mountable device comprising: a display assembly comprising: a frame; a display moveable with respect to the frame; a lens assembly comprising: a housing configured to be coupled to the frame; and a lens configured to be coupled to the display and being moveable with respect to the housing as the display moves with respect to the frame.

Clause C: a head-mountable device comprising: a display assembly comprising; a frame; and a display moveable with respect to the frame; a lens assembly comprising: a housing; a lens configured to be coupled to the display; and a tether coupling the lens to the housing and configured to extend to allow the lens to move with respect to the housing as the display moves with respect to the frame.

One or more of the above clauses can include one or more of the features described below. It is noted that any of the following clauses may be combined in any combination with each other, and placed into a respective independent clause, e.g., clause A, B, or C.

Clause 1: the display assembly engager, the face seal assembly, and the lens assembly engager each comprise a magnet.

Clause 2: the lens assembly further comprises a housing that extends around an interior region bounded by the lens assembly, the lens being within the interior region and providing a light pathway for light from the display to travel to eyes of the user.

Clause 3: a head engager extending from the display assembly and configured to secure the head-mountable device to a head of the user with the face seal assembly against the face of the user.

Clause 4: the lens assembly further comprises: a housing; and a tether coupling the lens to the housing and configured to extend to allow the lens to move with respect to the housing as the display moves.

Clause 5: the display assembly further comprises: a frame; and a display engager; and the lens assembly further comprises: a housing; a lens assembly engager configured to releasably engage the display engager and couple the lens to the display.

Clause 6: the lens assembly comprises a hinge connecting segments of the housing to fold the lens assembly.

Clause 7: the lens is a first lens; and the lens assembly further comprises a second lens.

Clause 8: the lens assembly is foldable such that, while in a folded configuration, the first lens overlaps the second lens.

Clause 9: the display assembly further comprises: a display assembly engager; and a display engager; and the lens assembly further comprises: a lens assembly engager configured to releasably engage the display assembly engager and couple the housing to the frame; a lens assembly engager configured to releasably engage the display engager and couple the lens to the display.

Clause 10: the display assembly engager, the display engager, the lens assembly engager, and the lens assembly engager each comprise a magnet Clause 11: the lens assembly further comprises a tether coupling the lens to the housing and configured to extend to allow the lens to move with respect to the housing.

Clause 12: a face seal assembly configured to engage a face of a user, the lens assembly being coupled between the display assembly and the face seal assembly.

Clause 13: the face seal assembly comprises a face seal assembly configured to engage the lens assembly engager.

Clause 14: the lens comprises a lens assembly engager; the tether comprises a tether engager configured to releasably engage the lens assembly engager and couple the tether to the lens.

Clause 15: the lens assembly engager and the lens assembly engager each comprise a magnet.

Clause 16: the tether is configured to stretch and contract to alter a length between the housing and the lens.

Clause 17: the tether is retractable to be at least partially within the housing.

As described above, one aspect of the present technology may include the gathering and use of data. The present disclosure contemplates that in some instances, this gathered data may include personal information or other data that uniquely identifies or can be used to locate or contact a specific person. The present disclosure contemplates that the entities responsible for the collection, disclosure, analysis, storage, transfer, or other use of such personal information or other data will comply with well-established privacy policies and/or privacy practices. The present disclosure also contemplates embodiments in which users can selectively block the use of or access to personal information or other data (e.g., managed to minimize risks of unintentional or unauthorized access or use).

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase (s) is essential to the subject technology or that such disclosure applies to all configurations of the subject technology. A disclosure relating to such phrase (s) may apply to all configurations, or one or more configurations. A disclosure relating to such phrase (s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
a display assembly comprising:
   a frame comprising a display assembly engager; and
   a display moveable with respect to the frame and comprising a display engager; and
a face seal assembly configured to engage a face, the face seal assembly comprising a face seal assembly engager; and
a lens assembly between the display assembly and the face seal assembly, the lens assembly comprising:
   a housing comprising a lens assembly engager configured to releasably engage the display assembly engager and the face seal assembly engager and secure the display assembly to the face seal assembly in a fixed relative position and orientation; and
   a lens moveable with respect to the housing and comprising a lens engager configured to releasably engage the display engager and secure the lens to the display.

2. The head-mountable device of claim 1, wherein the display assembly engager, the face seal assembly engager, and the lens assembly engager each comprise a magnet.

3. The head-mountable device of claim 1, wherein the housing extends around an interior region bounded by the lens assembly, the lens being within the interior region and providing a light pathway for light from the display to travel to eyes.

4. The head-mountable device of claim 1, further comprising a head engager extending from the display assembly and configured to secure the head-mountable device to a head with the face seal assembly against the face.

5. The head-mountable device of claim 1, wherein the lens assembly further comprises:
a tether coupling the lens to the housing and configured to extend to allow the lens to move with respect to the housing as the display moves.

6. The head-mountable device of claim 1, wherein the lens assembly comprises a hinge connecting segments of the housing to fold the lens assembly.

7. The head-mountable device of claim 1, wherein:
the lens is a first lens; and
the lens assembly further comprises a second lens.

8. The head-mountable device of claim 7, wherein the lens assembly is foldable such that, while in a folded configuration, the first lens overlaps the second lens.

9. A head-mountable device comprising:
a display assembly comprising:
   a frame; and
   a display moveable with respect to the frame; and
a lens assembly comprising:
   a housing configured to be coupled to the frame with a first engagement; and
   a lens moveable with respect to the housing and configured to be coupled to the display with a second engagement, separate from the first engagement, such that the display and the lens are maintained in a fixed orientation and position relative to each other as the display moves with respect to the frame.

10. The head-mountable device of claim 9, wherein the lens assembly further comprises a tether coupling the lens to the housing and configured to extend to allow the lens to move with respect to the housing.

11. The head-mountable device of claim 9, wherein:
the display assembly further comprises:
   a display assembly engager; and
   a display engager; and
the lens assembly further comprises:
   a lens assembly engager configured to releasably engage the display assembly engager and couple the housing to the frame; and
   a lens engager configured to releasably engage the display engager and couple the lens to the display.

12. The head-mountable device of claim 11, wherein the display assembly engager, the display engager, the lens assembly engager, and the lens engager each comprise a magnet.

13. The head-mountable device of claim 11, further comprising a face seal assembly configured to engage a face, the lens assembly being coupled between the display assembly and the face seal assembly.

14. The head-mountable device of claim 13, wherein the face seal assembly comprises a face seal assembly engager configured to engage the lens assembly engager.

15. A head-mountable device comprising:

a display assembly comprising;

a frame comprising a display assembly engager; and a display moveable with respect to the frame and comprising a display engager;

a lens assembly comprising:

a housing comprising a lens assembly engager configured to engage the display assembly engager and secure the lens assembly to the display assembly;

a lens moveable with respect to the housing and comprising a lens engager configured to engage the display engager and secure the lens to the display; and a tether coupling the lens to the housing and configured to extend to allow the lens to move with respect to the housing as the display moves with respect to the frame.

16. The head-mountable device of claim 15, wherein:

the lens engager is a first lens engager:

the lens further comprises a second lens engager; and the tether comprises a tether engager configured to releasably engage the second lens engager and couple the tether to the lens.

17. The head-mountable device of claim 16, wherein the lens assembly engager and the lens engager each comprise a magnet.

18. The head-mountable device of claim 15, wherein the tether is configured to stretch and contract to alter a length between the housing and the lens.

19. The head-mountable device of claim 15, wherein the tether is retractable to be at least partially within the housing.

* * * * *